United States Patent
Gidra et al.

(10) Patent No.: US 9,846,645 B1
(45) Date of Patent: Dec. 19, 2017

(54) MANAGING OBJECTS STORED IN MEMORY

(71) Applicant: Hewlett Packard Enterprise Development LP, Houston, TX (US)

(72) Inventors: Lokesh Gidra, Palo Alto, CA (US); Evan R. Kirshenbaum, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 84 days.

(21) Appl. No.: 15/167,677

(22) Filed: May 27, 2016

(51) Int. Cl.
 *G06F 12/02* (2006.01)
 *G06F 3/06* (2006.01)

(52) U.S. Cl.
 CPC ........ *G06F 12/0261* (2013.01); *G06F 3/0608* (2013.01); *G06F 3/0631* (2013.01); *G06F 3/0652* (2013.01); *G06F 3/0673* (2013.01); *G06F 2212/1044* (2013.01)

(58) Field of Classification Search
 CPC ............ G06F 12/0253; G06F 12/0261; G06F 2212/1044; G06F 3/0608; G06F 3/0652; G06F 3/0673
 See application file for complete search history.

(56) References Cited

U.S. PATENT DOCUMENTS

| 7,340,494 B1* | 3/2008 | Detlefs | G06F 12/0269 |
| 8,108,547 B1* | 1/2012 | Caronni | H04L 67/1097 709/238 |
| 2010/0191928 A1* | 7/2010 | Hawblitzel | G06F 12/0253 711/166 |

* cited by examiner

*Primary Examiner* — Hashem Farrokh
(74) *Attorney, Agent, or Firm* — Hewlett Packard Enterprise Patent Department

(57) ABSTRACT

In one example in accordance with the present disclosure, a method for managing objects stored in memory may include identifying a first object in a heap. The heap may be accessed by a plurality of mutator threads executing within a first plurality of operating system processes. The method may also include determining that the first object is a reachable object and determining that a first range of memory locations in the heap does not contain any reachable object. The method may also include receiving an allocation request from a second mutator thread from the plurality of mutator threads and allocating a first free chunk of memory including at least a part of the first range of memory locations to the second mutator thread.

15 Claims, 5 Drawing Sheets

MANAGING OBJECTS STORED IN MEMORY

BACKGROUND

Garbage collection is a type of memory management where a garbage collector reclaims memory occupied by objects that are no longer in use. Garbage collection may be used and/or required by certain programming languages. Although garbage collection may provide significant benefits, garbage collection may require some system overhead and thus may impact performance.

BRIEF DESCRIPTION OF THE DRAWINGS

The following detailed description references the drawings, wherein.

DETAILED DESCRIPTION

Figure 1:
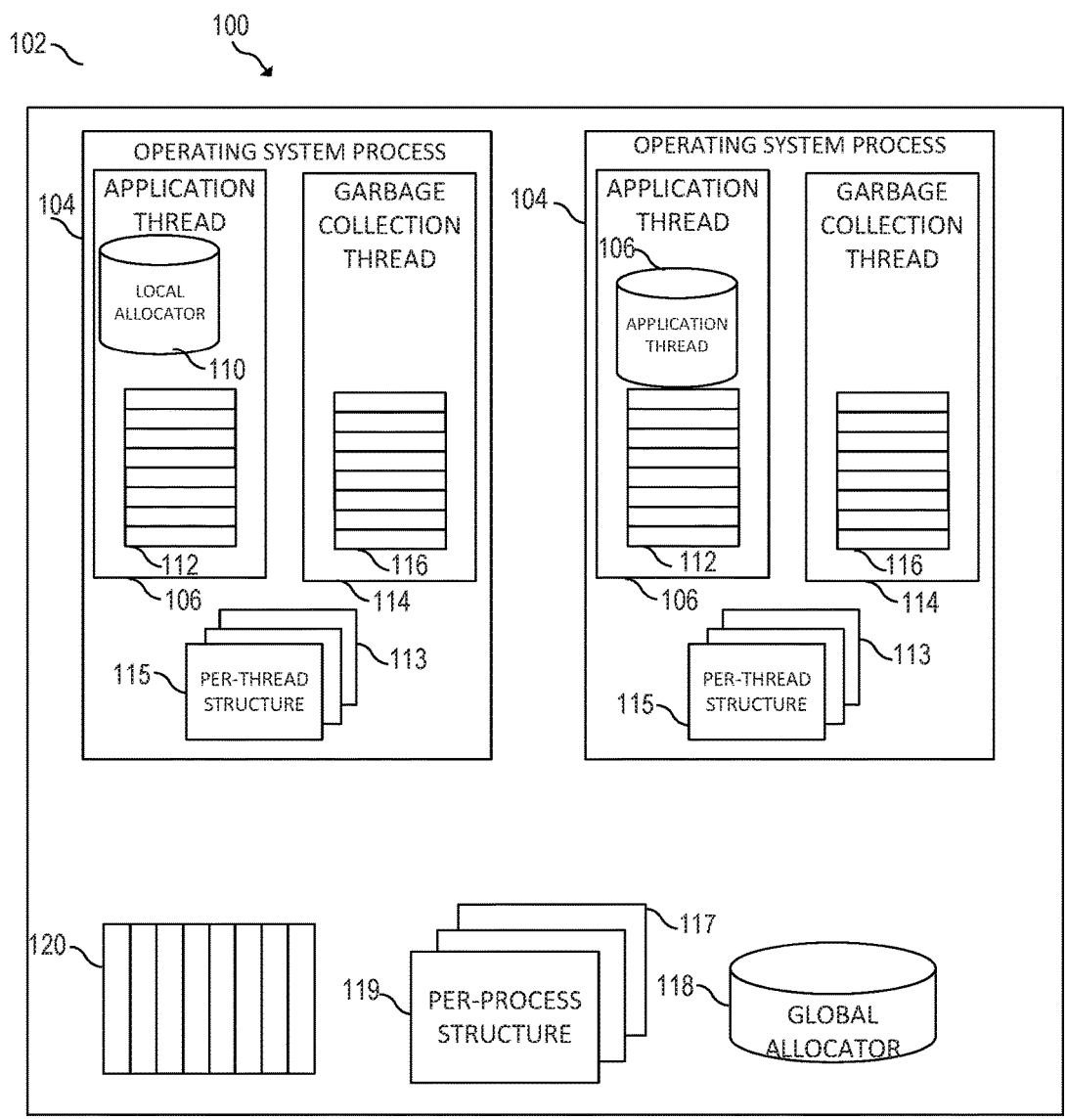
FIG. 1 is a block diagram of an example environment in which managing objects stored in memory may be useful.

The data accessed within a computer system may comprise a set of objects (also known as records, structures, instances, or simply data values) stored in the memory or storage of the computer system. Access to objects may be by use of pointers (also known as references or links) that contain sufficient information to identify the object they refer to. This information may include an address of the object, an offset from a base address, a key that can be looked up in a table, or other information.

These pointers may be stored within processor registers, on a program stack, in global variables, within objects, and elsewhere. In a system that employs garbage collection, some objects may be allocated on a heap managed by a garbage collector. When an object is allocated, unused space is identified on the heap, and the object is created in that space. The job of the garbage collector is to identify regions of memory within the heap that are known to not contain any reachable objects, where an object is considered to be reachable if it would be possible for any application thread within any process using the heap to obtain a pointer to the object, and to return the memory in such regions to the allocator for use in allocating new objects. Regions of memory within the heap that do not contain reachable objects may be called "garbage regions" or "garbage ranges". Identifying garbage regions may involve identifying allocated objects that are or may be reachable objects and determining that the space occupied by such reachable objects is not part of any garbage region.

Garbage collection may involve determining a set of root pointers. The root pointers may be found in processor registers, in global variables, on a program stack, etc. Garbage collection may include determining objects that are reachable starting from the root pointers. An object is considered reachable if it is pointed to by a root pointer or by a pointer contained in some reachable object. Pointers may be considered to be strong pointers or weak pointers. An object referred to by a strong pointer that is a root or is contained in a reachable object is considered reachable. A weak pointer, by contrast, does not affect the reachability of the thing it points to.

Garbage collection may include collecting memory previously allocated to the objects that are no longer reachable and making the memory available for future allocation. As described above, Garbage collection may consider an object "reachable" if there is any way of reaching it by following pointers from a reachable object, and may collect the memory occupied by objects once the objects become unreachable, where collected memory is made available to satisfy future requests to allocate objects.

Garbage collection may comprise several activities that are performed sequentially or in parallel. When processed sequentially, these activities may be called "phases". For example, a garbage collector may perform a marking phase (also known as a "tracing phase"), in which the reachability of objects on the heap are identified. An example marking phase where different colors are used for different reachability statuses is discussed in further detail below. A garbage collector may also perform a "sweeping phase", in which regions of memory determined to not contain reachable objects (during the marking phase) are made available for the satisfaction of subsequent requests to allocate objects. Garbage collection activities may be performed in a cyclic manner, where the performance of the activities in one garbage collection cycle is followed by the performance of the activities in the next cycle. For example, if a garbage collection cycle comprises a marking phase followed by a sweeping phase, then the sweeping phase of cycle 1 may be followed by the marking phase of cycle 2.

At the beginning of a garbage collection cycle, a garbage collector may determine all of the root pointers for each process that is using the heap as well as root pointers that are not associated with any process. Root pointers to objects on garbage collected heap can be found on a thread's local stack. To find root pointers on the thread's local program stack (also known as an execution stack), the stack may be scanned and root pointers may be identified. Example systems for managing objects may provide a way to identify other pointers not on a thread's program stack as root pointers to objects on the garbage collected heap. Example systems for managing objects may enforce that storing a pointer to a heap object in any location other than on the garbage collected heap or the program stack is permitted if it can be ensured that there exists a pointer to the same object in an identifiable location such as a well-known external pointer table, whose contents may be enumerated. Determining root pointers for a process may comprise enumerating pointers thus identified. Example systems for managing objects may further provide a way to identify a pointer as a "persistent root pointer", which should continue to be considered to be a root pointer even after the process terminates. Identifying root pointers not associated with any process may comprise enumerating persistent root pointers. In some examples, persistent root pointers may be associated with a key, which may be a number, string, or other identifier, which may allow a persistent root pointer to be replaced or removed. In some examples, the association between keys and persistent root pointers may be implemented by means of a map data structure, for example, a lock-free cuckoo map data structure, that is stored as an object on the heap. In such examples, enumerating the persistent root pointers may comprise identifying the pointer to the map data structure. Enumerable objects that contain root pointers, such as external pointer tables or persistent root maps may be called root pointer source objects.

An example method for managing objects stored in memory may include identifying a first object in a heap. The heap may be accessed by a plurality of mutator threads (also called application threads) executing within a first plurality of operating system processes and each mutator thread in the plurality may have a corresponding garbage collection thread from a plurality of garbage collection threads executing within a second plurality of operating system processes. A mutator thread is an application that allocates objects on the garbage collected heap or refers to or modifies objects on the garbage collected heap. A garbage collection thread manages the memory in the garbage collected heap by assisting in identifying regions of memory that do not contain any reachable objects and making such memory regions available for future object allocation.

A process which includes one or more garbage collection threads may be called a garbage collection process. The method may also include determining, based on a root pointer associated with a first mutator thread from the plurality of mutator threads, that the first object is a reachable object and determining, based on a marking phase of a garbage collection cycle, that a first range of memory locations in the heap does not contain any reachable object. The method may also include receiving an allocation request from a second mutator thread from the plurality of mutator threads and allocating a first free chunk of memory, including at least a part of the first range of memory locations, to the second mutator thread.

FIG. 1 is a block diagram of an example environment 100 in which managing objects stored in memory may be useful. A portion of the memory may be designated as a heap, which may be used for allocation of objects. The memory which includes the heap may be or may contain non-volatile memory (also called persistent memory) such as flash memory, resistive memory, phase change memory, spin-transfer torque memory, or memristor memory. The heap may also be or contain volatile memory such as dynamic random-access memory (DRAM), which may be made non-volatile by ensuring that modifications to the volatile memory are reflected in a non-volatile memory or a storage device such as a hard disk drive (HDD) or solid-state device (SSD) drive. In some examples, volatile memory may be considered to be non-volatile while it retains power. The size of the heap may be of various sizes, including multiple hundreds of terabytes, petabytes or larger and may contain a very large number of allocated and reachable objects. In order to have a garbage collector that does not unacceptably affect the performance of applications using such a heap, it may be important to use a garbage collection technique that does not interrupt the application threads' progress at all, or interrupts the application threads' progress for a constant time period that is shorter than and not proportional to the size of the heap, the number of allocated objects in the heap, or the number of reachable objects in the heap. An example of such a garbage collection technique may be one that guarantees a maximal pause to an application thread that is proportional to the thread's program stack size.

The environment 100 includes a system 102 that may include operating system processes 104 (also known as applications or running programs), each process including one or more application threads 106, and each application thread 106 may have an associated local allocator 110 and mark buffer 112. Each process may also have a list 113 of per-thread structures, one or more garbage collection (GC) threads 114, and a mark list 116. The system 102 may also have, in non-volatile memory, a list 117 of per-process structures 119, a global allocator 118 and a mark bitmap 120 accessible to threads in each process 104. Although two processes 104 are depicted in the system 102 of FIG. 1, other number of processes 104 may be used. Similarly, although each process 104 is depicted as having one application thread 106, other numbers of application threads 106 may be used and different processes 104 may have different numbers of application threads 106.

The thread-local allocator 110 may be designed with the expectation that its associated application thread 106 is the only thread that will interact with it and that, therefore, no care must be taken that accesses to the thread-local allocator 110 employ synchronization methods (e.g., locks or lock-free techniques) to guarantee consistency of the contents of the thread-local allocator 110. Thread-local allocator 110 may be used to allocate memory for newly created objects when requested by the corresponding thread (i.e. thread 106, etc.). To satisfy such requests, thread-local allocator may contain a set collection of unallocated chunks, which may be regions of heap memory that are known to not contain objects. The memory management system may ensure that if a chunk is contained by thread-local allocator 110, it is not concurrently contained by any other thread-local allocator 110 associated with another thread 106 or by the global allocator 118. To facilitate identification of a chunk large enough to satisfy an allocation request, the thread-local allocator's 110 collection may be implemented as a map, such as a hash map or a map implemented as by a red-black tree, whose keys are numbers representing chunk sizes and whose values are collections (e.g., lists such as linked lists) of chunks of the corresponding size. To satisfy an allocation request for a given memory size, a smallest chunk containing at least the given size may be removed from the collection. If the removed chunk is larger than the requested size, a sufficiently large portion may be removed from the chunk and used as the result of the allocation request, and the remainder of the chunk may be returned to the collection. If the remainder of the chunk is deemed to be too small to satisfy a subsequent allocation request, it may be not returned to the collection. When the thread-local allocator 110 does not contain a large-enough chunk of memory to fulfil an allocation request, thread local allocator 110 may request additional computer system 102 memory from the global allocator 118. In this manner, the global allocator 118 may manage memory used by the entire computer system 102. When the thread-local allocator 110 requests addition memory from the global allocator, an amount of memory larger than the request may be given. For example, if a thread-local allocator 110 requests X bytes from the global allocator, a chunk of memory up-to 'Y' bytes, where Y may be greater than X and may be dynamically adjusted, may be allocated to the thread local allocator so that some subsequent allocation requests can be locally met. If the chunk obtained from the global allocator 118 exceeds the requested size, the excess may be added to the thread-local allocator's 110 collection.

Global allocator 118 may be implemented using an array of lists of unallocated chunks in which each element of the array stores a list of chunks whose sizes are between a minimum and a maximum size, where the maximum size for one list is one less than the minimum size for the next list. In an example system, the first list may contain chunks of at least 16 bytes, but fewer than 32 bytes, the next chunks of at least 32 bytes, but fewer than 64 bytes, and so on, with the minimum for each list being twice the minimum number of bytes of the prior list. To obtain a chunk of a requested size, the global allocator 118 may identify the index of the array whose list would contain chunks of that size. If the list at that element is empty or the global allocator 118 is able to remove from the list a chunk of at least the requested size, the global allocator 118 may identify the next larger index in the array whose list is not empty and from which the global allocator 118 is able to remove a chunk. As all chunks on subsequent lists are guaranteed to be larger than the requested size, any chunk on a subsequent list will satisfy the request. If the removed chunk is larger than the requested size, a portion of the chunk sufficient to satisfy the request may be identified as the result of the request, and the remainder may be added as a chunk to the list at the index in the array corresponding to the size of the remainder. To facilitate these operations, every chunk contained within the global allocator 118 may have two members: an indication of the exact size of the chunk, and a pointer to the next chunk in the list.

The global allocator 118 may be implemented in a manner to ensure that its data structures remain consistent in the face of simultaneous allocation requests by different threads 106. To facilitate efficiency and availability in the face of failures of processes 104 that may have threads 106 in the middle of such allocation requests at the time of failure, lock-free data structures may be employed. For example, the lists contained within the array may be implemented as lock-free stacks comprising a pointer to the most recently added chunk in the list and maintained by a compare-and-swap (CAS) operation, which takes as parameters an expected value and a desired new value, atomically changes the location to the desired value if and only if the location currently holds the expected value, and returns an indication of whether such a replacement took place. To add a chunk to the lock-free stack, the current top-of-stack pointer may be read, and this value may be set as the next-chunk pointer in the chunk to be added. A CAS attempt may then be made to modify the top-of-stack pointer from the previously read value to a pointer to a pointer to the chunk to be added. If this is unsuccessful, the entire process may be repeated. To remove a chunk, the top-of-stack pointer may be read, the next-chunk pointer may be read from the chunk the read pointer points to, and a CAS attempt may be made to modify the top-of-stack pointer from the previously read value to the read next pointer. If this is unsuccessful, the process may be repeated. Such a repeated attempt to modify a location by means of CAS operations may be called a "CAS loop". In this use, the CAS operation may be used to determine that the value was not changed (e.g., by another thread) in between the time it was read and the time the modification is attempted. To prevent inconsistencies arising due to the value changing from A to B and back to A, which would allow the CAS to succeed and give a false impression of lack of change, the top-of-stack pointer may include within its value a version number that is incremented on each modification.

Each object in the garbage collected heap may be associated with an object descriptor, which may be locatable based on the address of the object. For example, the object descriptor may comprise the word at the address of the object or immediately prior to the address of the object. A word may be a number of bits or bytes of memory (e.g., eight contiguous bytes). The object descriptor may contain sufficient information to determine the size of the object, e.g., in words or bytes. The object descriptor may further provide means for enumerating pointers to objects in the garbage collected heap that are contained within the object. The object descriptor for an object may be made locatable as part of the allocation process and before any application thread 106 obtains a reference to the object.

Each application thread 106 associated with an operating system process 104 may be associated with a per-thread structure 115 in the list 113 of per-thread structures associated with the operating system process 104, which may be stored in volatile memory. The system 102 may ensure that a per-thread structure 115 be added to the list 113 before a corresponding thread application 104 is able to obtain a reference to an object on the heap. The list 113 of per-thread structures may be implemented using lock-free data structures. Each per-thread structure in the list 113 may include a thread ID, a reference to the application thread's 106 mark buffer 112, an is-live flag, a signal-handled flag and related flags. The thread ID may be used to identify the thread. The thread ID may be information sufficient to allow the garbage collection thread 114 to interrupt the execution of the application thread, e.g., by means of an operating system signal. The is-live flag may be a boolean value used to determine whether the per-thread structure 115 is currently in use. The system may ensure that the is-live flag has a true value initially and is set to a false value when the corresponding application thread 104 terminates. The garbage collection thread 114 may periodically iterate over the list 113 and delete any per-thread structure 115 that has an is-live flag having a false value. The signal-handled flag may be a boolean value used to inform the garbage collection thread 114 that the corresponding application thread 104 has processed the most recently sent signal.

The per-process structure list 117 may include a structure for every currently executing process 104. The per-process structures 119 may be stored on the non-volatile memory so that the structures are accessible if a process crashes. Each structure 119 in the per-process structure list 117 may include a mark-buffer list, a mark list 116, and liveness information for its associated process 104. The mark buffer list may include all the mark-buffers 112 of all application threads 106 associated with the process. The mark list 116 may be used by the garbage collection thread 114 to mark objects as reachable during the marking phase. The liveness information may include an indication of whether the associated process 104 is believed to be alive or dead as well as sufficient information to identify a process 104 and to determine whether the process 104 has died. In some examples, the sufficient information may include an operating system process ID (PID) and a timestamp indicating a start time of the process 104. The liveness information may be constructed in such a way that it may be atomically replaced in the per-process structure 119 by a CAS operation. The per-process structure list 117 may be implemented as a linked-list, in which every per-process structure 119 contains a pointer to the next per-process structure 119. New per-process structures 119 may be added to the beginning of the per-process-structure list 117 at the beginning of the list by using a CAS operation on a shared pointer.

A garbage collection cycle may consist of a first synchronization phase, a second synchronization phase, a marking phase, a sweeping phase, and a cleaning phase. As the behavior of both the garbage collection thread 114 and the application threads 106 associated with each operating system process 104 may differ based on the current phase of the cycle, it may be important that each such thread have an opinion of which phase of the cycle the system is currently in. The decision to transition from one phase to the next phase in the cycle may be made by the garbage collection thread 114. Pursuant to that decision, the garbage collection thread 114 can initiate the transition in each application thread 106 by iterating over the list 113 of per-thread structures and sending a signal (e.g., an operating system signal) to each corresponding application thread 106 when the per-thread structure 115 indicates, e.g., by the is-live flag, that the corresponding thread 106 is live. The signal sent may indicate, e.g., by its identity, the particular phase transition that is desired. When an application thread 106 receives a signal, the application thread 106 may interrupt its normal execution, execute a signal handler procedure corresponding to the signal received from the garbage collection thread, and, following completion of the signal handler procedure execution, resume its normal execution immediately following the interruption. At the end of the signal handler procedure, the application thread 106 may indicate, via the signal-handled flag in the per-thread structure 115, that the signal has been handled. The garbage collection thread 114 may monitor the signal-handled flags of the per-thread structures 115 in the list 113 of per-thread structures to determine that all application threads 106 have made the transition. When making this determination, it may ignore per-thread structures 115 that indicate, via the per thread structure's 115 is-live flag, that the corresponding application threads 106 are no longer alive.

To prevent interactions between the signal handler procedure and the interrupted procedure from corrupting data structures designed under the assumption that they will be used by a single thread at a time, it may sometimes be necessary to defer the execution of the signal handler procedure until a point at which it is safe to execute it. A per-thread structure 115 may include one or more signal deferral flags for this purpose. Before entering a region of code that would be problematic to be interrupted by a particular signal, an application thread 114 may set a flag indicating that the signal is to be deferred. Following the region, the flag may be cleared, indicating that the signal is no longer to be deferred. If the application thread 106 is interrupted by the signal from the garbage collection thread 114 within this region, the signal handler procedure associated with the signal may determine, by reading the flag, that the signal is to be deferred. In this case, instead of executing the remainder of the signal handling procedure, a second deferral flag may be set indicating that the signal was received and remains pending. Immediately after clearing the first deferral flag, the application thread 106 may check the value of the second deferral flag. If this flag indicates that a signal was received, the remainder of the signal handler procedure may be performed and the second deferral flag may be cleared.

To ensure synchronization of garbage collection threads 114, synchronization barriers may be employed. Garbage collection threads 114 may synchronize on synchronization barriers before attempting to signal their associated application threads 104 upon entry to the second synchronization phase, the marking phase, and the sweeping phase, as well as at several points during the sweeping phase that will be described below. Each synchronization barrier may have an associated process count which is shared among all processes 104 in the system 102 and which may be set to zero at any time when it can be determined that no garbage collection thread 114 is attempting to synchronize on the associated synchronization barrier. Each per-process structure 119 may have associated barrier information, including an indication of the next expected barrier, a barrier process ID, and an increment status. The increment status may be one of UNINCREMENTED, INCREMENTING, and INCREMENTED. To synchronize on a synchronization barrier, a garbage collection thread 114 may first atomically increment the associated waiting process count and stores the prior value of the waiting process count as the garbage collection thread's 114 associated barrier process ID. To ensure that this value is set following a successful increment even if the process 104 dies immediately following the increment, the increment may be performed by means of a CAS loop, as described above, in which the value of the waiting process count is read and stored as the barrier process ID, and then an attempt is made to modify the waiting process count to a value one greater than the value that was read. To assist in dealing with process failure, the increment status may be changed to INCREMENTING immediately prior to attempting to increment and to INCREMENTED immediately following the successful increment. This may ensure that if the process 104 crashes, another process 104 attempting to clean up from the crash may be sure about whether the garbage collection thread 114 incremented the waiting process count except in the short window in which the increment status is INCREMENTING. Following the successful increment, a shared system (102)-wide total count of running processes 104 is read. This total count may include a version number which is incremented each time the number is modified. The garbage collection thread 114 may then loop as long as the waiting process count is less than the total process count and a shared system (102)-wide indication of the current synchronization barrier is the one being waited for. While this is not yet the case, the garbage collection thread 114 may signal the operating system that it is willing to yield the processor to other threads and then re-read the total process count. As the death of a process 104 and its associated garbage collection thread 114 might otherwise ensure that the waiting process count will not equal the total process count, occasionally (e.g., randomly with a particular probability, every n iterations, or after a certain amount of wall-clock time) a garbage collection thread 114 may attempt to identify and clean up from dead processes 104, in a manner that will be described below and which may be different based on the particular synchronization barrier, and then update the total process count. After exiting the loop, the garbage collection thread 114 may update the next expected barrier and set the increment status to be UNINCREMENTED.

For purposes of determining reachability, all objects in the heap may be considered to have one of three "colors", white, gray, or black, where a white object is an object with an unknown reachability status, a gray object is an object that is known to be reachable, but whose internal references may not have yet been identified as reachable, and a black object is a reachable object whose internal references have been identified as reachable. At the beginning of a garbage collection cycle, all objects may be considered to be white. During the marking phase, the garbage collection thread 114 may process objects identified as gray, enumerating each of their internal references and noting them as gray if they are not already considered to be black. Once all of an object's internal references have been considered, the garbage collection thread 114 may indicate that the object is black. When there are no remaining gray objects, black objects are reachable objects, and the memory locations occupied by white objects may be considered to be garbage and may be collected in a subsequent sweeping phase of the garbage collection and used to satisfy subsequent object allocation requests.

Mark bitmap 120 may be used to keep track of objects identified as black. Mark bitmap 120 may be a data structure in non-volatile memory that allows the indication of the memory locations of the beginning and end of each black object. In an example, mark bitmap 120 may comprise two arrays, each of which contains one bit corresponding to each memory location that may begin an object. Multiple such bits may be stored in the same memory word, and identifying the bit corresponding to a memory location may comprise identifying, based on an address of the memory location, a word in the array and a bit position within the word. When two arrays are used, one array may be the start bitmap and be used to indicate the beginning of an object while the other array may be the end bitmap and be used to indicate the end of an object. To check whether an object is a black object, the bit in the start bitmap corresponding to the beginning of the object may be consulted. To note an object as a black object, the bits corresponding to the first and last locations in the object may be set in the start and end bitmaps respectively. To identify the end of an object, the size of the object may be obtained. The size of the object may be determined based on an associated object descriptor, as described above. Since the mark bitmap 120 may be accessed simultaneously by multiple garbage collection threads 114, to preserve consistency, setting the bits may be implemented by means of atomic operations such as the CAS operation described above or an atomic bitwise OR (disjunction) operation, which reads the old value at a memory location, ensures that one or more bits are set, and writes the resulting value, while preventing other threads from making changes to that memory location. The operation may return the value of bitmap before the operation is performed. In this manner it can be determined if the current thread is the first thread to set the bit. In some examples, if it is determined that the current thread is not the first thread to set a bit in one of the arrays, the marking process may forgo attempting to set the corresponding bit in the other array. In another example, a single array of bits may be used, with a subset of the bits (e.g., those at even bit positions) used to indicate the presence of the beginning of an object at a memory location and another subset of the bits (e.g., those at odd bit positions) used to indicate the presence of the end of an object at a memory location. At the completion of a marking phase, black objects may be indicated by the presence of a set bit in the start bitmap and a subsequent set bit in the end bitmap, while garbage ranges may be those indicated by the presence of a set bit in the end bitmap and a subsequent set bit in the start bitmap.

During the first and second synchronization phases and the making phase, application threads 106 may mark objects as gray by adding them to their respective mark buffers 112. The mark buffer 112 may be a queue data structure holding references to objects on the heap, designed in the expectation that only the associated application thread 106 may add references to the mark buffer 112 and only the associated garbage collection thread 114 may remove references from the mark buffer 112. In an example, the mark buffer 112 may be implemented as a queue of blocks, each of which contains a fixed-size array of references, a read index, and a write index, where adding a reference may comprise incrementing the write index of the last block in the queue, and if the last block is full, enqueuing a new block, and removing a reference may comprise incrementing the read index of the first block in the queue and removing the first block if all references in it have been read. A mark buffer 112 may be considered to be non-empty if the queue contains more than one block or if the difference between the write index and the read index in the only block is more than one.

An application thread 106 may mark objects as gray immediately prior to replacing reference-containing memory location with another reference by means of a write barrier procedure. During the first and second synchronization phases and the marking phase, the write barrier procedure may mark the object referred to by the reference being replaced as gray. During the first and second synchronization phases, the write barrier procedure may further mark the object referred to by the replacing reference as gray. If the contents of two reference-containing memory locations are being swapped, an application thread 106 may mark the objects referred to by both references as gray. When an object is marked as gray, it may be added to the mark buffer 112 unless the application thread 106 can determine via the mark bitmap 120 that the object has already been marked as black. During the process of marking an object as gray, the application thread 106 may defer the handling of the signal indicating the beginning of the marking phase, as described previously.

During the signal handler procedure for the signal indicating the transition to the marking phase, an application thread 106 may identify and mark as gray thread-local root pointers for that application thread 106. Identifying these thread-local root pointers may include iterating over the all of the words in the application thread's 106 execution stack that may contain references to objects in the heap. For each such word a determination may be made as to whether it is believed to point to an object in the heap. To make this determination, the application thread 106 may first determine whether the contents of the memory location has the form of a pointer and, if so, whether the pointer refers to a memory location in the heap. If it does, the contents of the memory location may be treated as a putative pointer and a determination may be made if the location it points to contains an allocated object. To make this determination, the location pointed to may be treated as containing a putative object pointer and it may be determined whether this putative object pointer is a valid object pointer. In other words, application thread 106 may identify a potential object pointer associated with a potential object descriptor, determine that the potential object descriptor is not a valid object descriptor and determine that the potential object pointer is not a pointer into the heap.

In an example, a valid object pointer may contain a partial encoding of the address of the word in the heap containing the object pointer, and any putative object pointer that points to a memory location that does not contain such a partial address encoding may be determined to not be a valid object pointer. If the putative object pointer is determined to be a valid object pointer, the object it points to may be determined to be a valid object and marked as gray as described above. To enumerate the memory locations on its program stack, an application thread 106 may obtain a pointer to the bottom of the program stack from the operating system or from a call to a library, e.g., a thread library, and it may obtain a pointer to the top of the program stack by placing a variable on the program stack and identifying the address of the variable as the top of the program stack. All words between the top and bottom of the program stack may be considered to be on the program stack. In an example, when interrupting the application thread's 106 execution to handle a signal, an operating system may ensure that the values of processor registers are placed on the program stack prior to executing the handler and restored following the execution of the handler. In such examples, enumerating, within the signal handler procedure, the pointers to objects on the heap that were stored on the program stack will therefore enumerate pointers to objects on the heap that were stored in processor registers at the time of the execution interruption. When the handling of this signal is deferred, the resumption of processing of the signal following the deferral may be accomplished by the application thread 106 sending itself the signal to ensure that the contents of registers have been captured.

During the marking phase, an application thread 106 may ensure that all objects newly allocated by that application thread 106 are marked as black by marking the object in the mark bitmap 120. The application thread may do this before the newly allocated object contains any references to objects on the heap. To avoid incorrect behavior during the sweeping phase if the application thread 106 should terminate unexpectedly while marking the object in the mark bitmap 120, the application thread 106 may mark the start of the object in the mark bitmap 120 before marking the end of the object in the mark bitmap 120. During the marking phase, the garbage collection thread 114 may mark objects as gray by adding references to them to its associated mark list 116, which may be implemented as a double-ended queue (deque) in non-volatile memory. To add a reference to the mark list 116, the reference may be pushed onto the front of the deque. Following the determination, by the garbage collection thread 114 and as described above, that all application threads 106 have transitioned to the marking phase, the garbage collection thread 114 may enumerate root pointers not on an application thread's 106 program stack as described above. For example, garbage collection thread 114 may identify a root pointer source object that is not stored on a program stack, enumerate root pointers based on the root pointer source object and determine that objects in the heap pointed to by enumerated root pointers are reachable objects. Pointers so enumerated may be marked as gray by the garbage collection thread 114.

During the marking phase, the garbage collection thread 114 may mark an object as black by enumerating references contained in the object, marking each non-null enumerated contained reference as gray by adding it to the mark list 116, and then marking the beginning and end of the object in the mark bitmap 120 as described above. The enumeration of contained references may be made by reference to an object descriptor associated with the object. In other words, the garbage collection thread 114 may enumerate a pointer stored within a first object by reference to an object descriptor associated with the first object, determine the pointer points to a second object in the heap and determine that the second object is a reachable object.

During the marking phase, the garbage collection thread 114 may process its mark list 116 by the following procedure. While the mark list 116 is not empty, a copy of the reference at the front of the mark list 116 may be added to the back of the mark list 116 and then the reference may be removed from the front of the mark list 116. The object referred to by the removed reference may then be marked as black as described above. Then the copy of the removed reference may be removed from the back of the mark list 116. Adding and subsequently removing the copy of the reference may ensure that the reference does not get lost and will get subsequently processed should the garbage collection thread 114 unexpectedly terminate while marking the object as black. To allow garbage collection threads 114 that have completed their work in a marking phase to assist other garbage collection threads 114 that have not yet completed, the per-process structure 119 associated with each garbage collection thread 114 may contain an offered reference, initially null. While processing its mark list 116, before processing each reference at the front of the mark list, if the mark list contains more than one reference and the associated offered reference is not null, the garbage collection thread 114 may set the offered reference to be the reference at the back of the mark list 116, which is then removed from the mark list 116.

Figure 2:
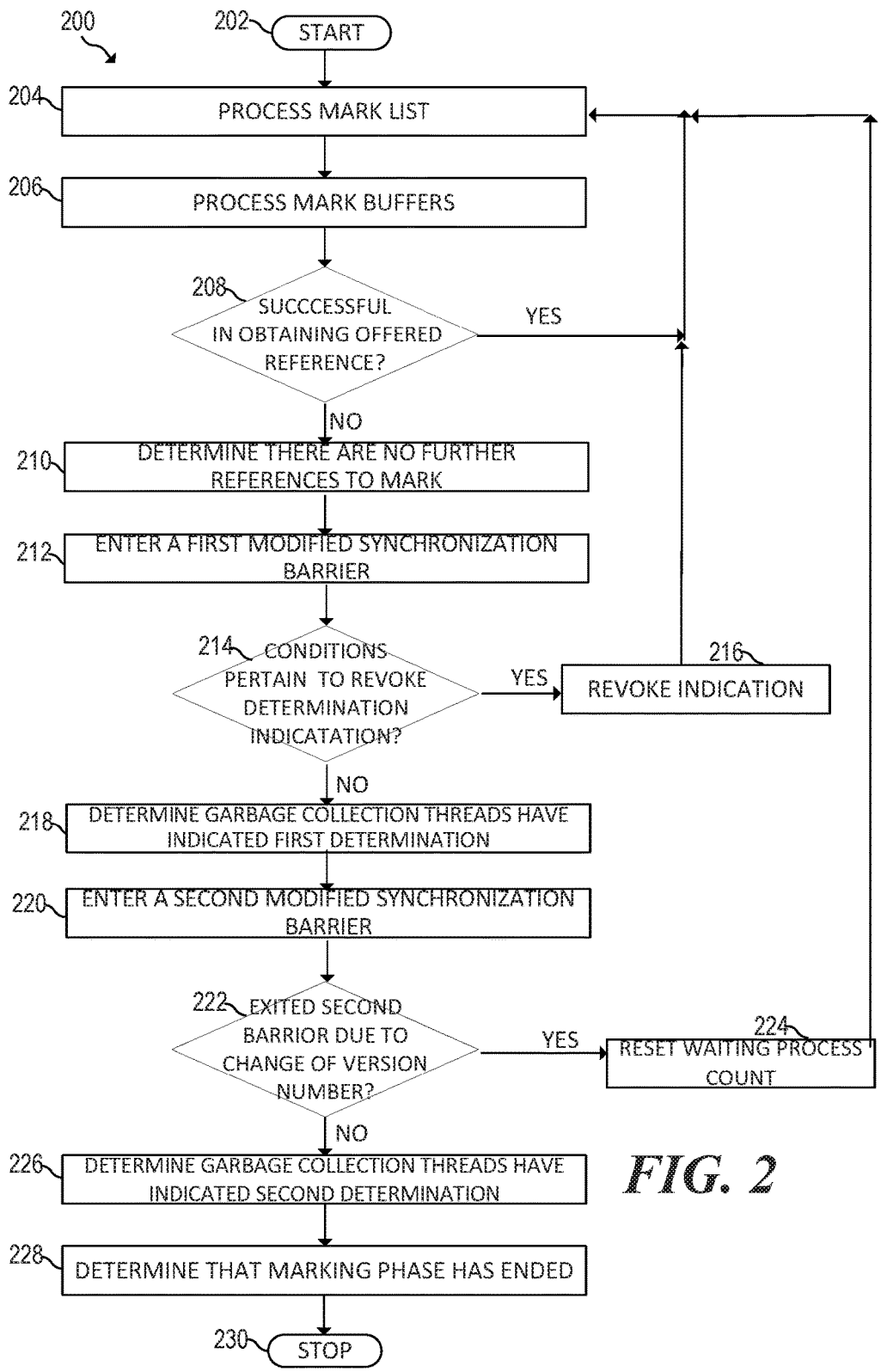
FIG. 2 is a flowchart of an example method for managing objects stored in memory.

During the marking phase, the garbage collection thread 114 may enumerate and mark as gray non-stack root pointers obtained from one or more root pointer source objects, e.g., by enumerating pointers in an external pointer table and by enumerating persistent root pointers. The garbage collection thread 114 may then execute method 200. FIG. 2 is a flowchart of an example method 200 for managing objects stored in the memory of a computer system. Although method 200 is described below as being executed by system 102 of FIG. 1, the method 200 may be executed or performed by other systems, for example, system 400 of FIG. 4 or system 500 of FIG. 5. Other suitable systems and/or computing devices may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In alternate examples of the present disclosure, at least one step of method 200 may be executed substantially concurrently or in a different order than shown in FIG. 2. In alternate examples of the present disclosure, method 200 may include more or less steps than are shown in FIG. 2. In some examples, at least one of the steps of method 200 may, at certain times, be ongoing and/or may repeat.

Method 200 may start at step 202 and continue to step 204, where the garbage collection thread may process the mark list 116. At step 206, the garbage collection thread 114 may process the mark buffers 112 associated with each associated application thread 106. This may include marking each contained reference as black and then removing it from the mark buffer 112. After each mark buffer is processed, the mark list 116 may be processed as described above. The mark buffers 112 may be processed repeatedly until an iteration is made during which all mark buffers 112 were found to be empty. At step 208, the garbage collection thread 114 may attempt to obtain an offered reference from a per-process structure 119 in the list 117 of per-process structures 119 by iterating through the list 117 of per-process structures 119 and attempting to move a non-null reference from the offered reference of each per-process structure 119 to the front of the garbage collection thread's 114 mark list 116. In other words, the method 200 may include making a first determination that there are no available references for the garbage collection thread to mark and indicating the first determination in the non-volatile memory If it is successful in doing so (YES branch of step 208), the method may return to step 204. If it is unsuccessful (NO branch of step 208), in obtaining an offered reference, the method may include determining, at step 210, that there are no further available references for it to mark.

The method may then proceed to step 212, where the method may include entering, by the garbage collection thread 114, a first modified synchronization barrier. Incrementing the waiting process count of the first modified synchronization barrier may indicate the first determination, with respect to the garbage collection thread 114, in the non-volatile memory. In the first modified synchronization barrier, the waiting process count includes a version number, which is incremented as described below. While waiting for the waiting process count to equal the total process count, the garbage collection thread 114 may also check to see whether the version number of the waiting process count has changed, and exit the waiting loop, exiting the first modified synchronization barrier, upon determining that it has changed. A change in the version number of the waiting process count may indicate that another garbage collection thread 114 has revoked its first indication. At step 214, the garbage collection thread 114 may determine, whether conditions pertain that would cause it to revoke its first determination indication. Such conditions may include the version number associated with the waiting process count being different from the version number at the time the garbage collection thread 114 indicated its first determination (such change indicating that another garbage collection thread 114 revoked its first determination), the garbage collection thread's 114 associated mark list 116 not being empty, and a mark buffer 112 associated with the garbage collection thread 114 not being empty. If such any such condition is determined to exist (YES branch of block 214), the garbage collection thread may, at step 216, revoke its indication by atomically changing the waiting process count to a new value with a count of zero and a version number greater than its previous version number. Following the revocation, the garbage collection thread 114 may return to step 204.

If no revocation conditions are determined to exist (NO branch of block 214), the garbage collection thread may, at step 218, make a second determination that all garbage collection threads 114 have indicated and not revoked the first determination. The method 200 may include indicating the second determination in the non-volatile memory. The method may then proceed to, step 220, the garbage collection thread 114 may enter a second synchronization barrier. Incrementing the waiting process count of the second synchronization barrier may indicate the second determination, with respect to the garbage collection thread 114, in the non-volatile memory. While waiting for the second synchronization barrier's waiting process count to equal the total process count, the garbage collection thread 114 may also check to see whether the version number of the waiting process count of the first modified synchronization barrier has changed, and exit the waiting loop, exiting the second synchronization barrier, upon determining that it has changed. Also, while waiting in the second synchronization barrier, if the garbage collection thread 114 identifies and cleans up after a dead process, it may atomically increment the version number of the waiting process count of the first modified synchronization barrier. At step 222, the garbage collection thread 114 may determine whether it exited the second synchronization barrier due to a change of version number of the waiting process count of the first modified synchronization barrier. If the determination is that the exit was due to a version number change (YES branch of step 222), the garbage collection thread 114 may, at step 224, reset the waiting process count of the second synchronization barrier to zero and the method may return to step 204. If the determination is that the exit was due to other reasons (NO branch of step 222) (e.g., the waiting process count equaling the total process count), the garbage collection thread 114 may, at step 226, make a third determination that all garbage collection threads 114 have indicated and not revoked the second determination. At step 228, the garbage collection thread 114 may determine that the marking phase has ended and proceed to step 230, where method 200 may end. In this manner, a plurality of garbage collection process cooperatively coordinate to execute a garbage collection process.

Turning back to FIG. 1, following the execution of method 200, the garbage collection thread 114 may signal its associated application threads 106 to transition to the sweeping phase and then the garbage collection phase 114 may enter the synchronization barrier guarding the transition to the sweeping phase. During the processing of a request to allocate an object, an application thread 106 may defer the handling of the signal indicating transition to the sweeping phase, as described above. Before entering the sweeping phase, an application thread 106 may take steps to ensure that its associated thread-local allocator 110 does not contain any memory chunks.

During the sweeping phase, objects may not be marked, but ranges of memory locations, called garbage ranges, that have been determined to not contain reachable objects may be added to the global allocator 118 or a thread-local allocator 110 to be used to satisfy subsequent object allocation requests. Adding the garbage ranges to the global allocator 118 or to a thread-local allocator 110 may be called "collecting" the garbage range, and such collected garbage ranges may be called "chunks" of memory. The process of identifying and collecting garbage ranges may be called "sweeping". Garbage ranges may be identified as containing memory locations between the end of a marked object, as recorded in the mark bitmap 120, and the beginning of the next marked object, as recorded in the mark bitmap 120. In addition, memory locations before the beginning of the first object in the heap and after the last marked object in the heap may be identified as garbage ranges and added as chunks in the allocator. Garbage ranges identified during the sweeping phase may preferentially be as large as possible to better facilitate satisfying allocation requests.

Multiple threads may cooperate in identifying and collecting garbage ranges, and these cooperating threads may include garbage collection threads 114 and application threads 106. Application threads 106 may cooperate in sweeping when they determine that neither their thread-local allocator 110 nor the global allocator 118 contains a sufficiently-large chunk to satisfy an allocation request. When an application thread 106 collects a garbage range, all or part of the garbage range may be added to the application thread's 106 thread-local allocator 110, with any remainder added to the global allocator 118.

The global allocator 118 may comprise two arrays of lists of the form described above, with one of the lists being designated as the active array and the other being designated as the inactive array. In other examples, more or fewer arrays of lists and different numbers of active and inactive arrays may be used. Application threads 106 may be constrained to use the active array when attempting to satisfy an allocation request. The identification of an array as active or inactive may change over time, but all garbage collection threads 114 and application threads 106 may be constrained to agree as to which array is the active array at any time an allocation request may be satisfied or a garbage range may be collected. The respective identifications may be reversed during the transition to the sweeping phase, with the prior active array becoming the new inactive array and the prior inactive array becoming the new active array. Prior to this reversal, the inactive array may be modified to contain only empty lists of chunks.

The sweeping phase may comprise three sub-phases, each terminated by a synchronization barrier. All garbage collection threads 114 may cooperate in the sweeping phase.

During the first sub-phase, a garbage collection thread 114 may atomically remove chunks from the inactive array of the global allocator 118. As these chunks were in the active array of the global allocator 118 prior to the reversal of array identifications, it is known that the chunks do not contain reachable objects. For each removed chunk, the garbage collection thread 114 may attempt to expand the chunk by identifying in the mark bitmap 120 the end of the nearest marked object preceding the chunk (or the beginning of the heap if there is no such marked object) and the beginning of the nearest marked object following the chunk (or the end of the heap if there is no such marked object). It may be determined that the expanded chunk is also a garbage range. It is possible that this new garbage range comprises multiple previously-identified garbage ranges separated by one or more previously-unidentified garbage range.

In such a case, attempting to expand any of the previously-identified garbage ranges may result in the same expanded garbage range. To ensure that one single garbage collection thread 114 adds the expanded chunk to the global allocator 118, the garbage collection thread 114 attempts to mark the expanded chunk in the mark bitmap 120. This attempt will succeed if the garbage collection thread 114 is the first to attempt to mark the expanded chunk. If the attempt succeeds, the expanded bounds may be pushed onto an expanded chunk list, which may be implemented as a deque in non-volatile memory associated with the garbage collection thread's 114 per-process structure 119. When selecting chunks to remove from the inactive array, the garbage collection thread may preferentially choose relatively large chunks by identifying the non-empty list in the inactive array that corresponds to the largest chunk-size class. The garbage collection thread 114 may stop after removing, expanding, and, optionally, successfully marking a fixed number of chunks, where that number may be one.

During the second sub-phase, the garbage collection thread 114 may process its expanded chunk list, removing each begin-end pair and adding the garbage range so described to the global allocator 118.

For example, garbage collection thread 114 may identify a second range of memory locations in the heap corresponding to a free chunk contained within a previous global allocator and determine that a third range of memory locations in the heap adjacent to the second range of memory locations does not contain any reachable object. Garbage collection thread 114 may also expand the second range of memory locations to a fourth range of memory locations in the heap including at least the second range of memory locations and the third range of memory locations and add the fourth range of memory locations to an allocator.

The garbage collection thread 114 may participate in walking the memory to identify garbage chunks. To support this operation, the memory in the heap may be construed as a sequence of fixed-size blocks of addresses, where the block size may be, for example, 1,024 eight-bit words, or 8,192 bytes. The block size, expressed in words, may be constrained to be a power of two. The garbage collection thread 114 may repeatedly obtain a block assignment, for example by atomically incrementing a shared counter stored in non-volatile memory to obtain a block number and being assigned the corresponding block. If the obtained block number does not correspond to a block in the heap, e.g., if it is too large, the garbage collection thread 114 may treat this as an indication that it is finished performing the second sub-phase. If the assigned block is valid, the garbage collection thread 114 has the responsibility for collecting all garbage ranges that begin within that block, where the last such garbage range may terminate in a subsequent block and may involve skipping over blocks containing all garbage. For example, during a sweeping phase of the garbage collection cycle, a plurality of sweeping threads from a group of threads may be identified. The groups of threads including the plurality of mutator threads and the plurality of garbage collection threads. A sweeping thread belonging to the plurality of sweeping threads may be assigned a second range of memory locations in the heap. A second free chunk of memory beginning within the second range of memory locations may be identified by the sweeping thread, and the second free chunk may be made available to an allocator.

To facilitate this process, the garbage collection thread 114 may make use of a shared non-volatile clear block bitmap, which may contain, for each block, an indication (e.g., a bit) of whether the mark bitmap 120 is known to not contain an indication that any word in the block is the first word of any marked object and an indication of whether the mark bitmap 120 is known to not contain an indication that any word in the block is the last word of any marked object. When adding an expanded chunk to the global allocator 118, the garbage collection thread 114 may ensure that all complete blocks within the expanded chunk are marked in the clear block bitmap as being known to not be indicated in the mark bitmap 120 as containing either the first or the last word of any marked object.

If the garbage collection thread 114 determines based the clear block bitmap that the mark bitmap 120 does not contain the indication of the last word of any object in the assigned block, it may thereby determine that no garbage range begins in the block and it may therefore obtain another assigned block and process it. Otherwise, the garbage collection thread 114 may set a search begin boundary to point to the first word of the block and may use the mark bitmap 120 to identify the next word greater than the search begin boundary that represents the end of a marked object, when such a word can be found within the block. If no such word is found, the block has been processed. If no garbage ranges were found during the processing, the clear block bitmap may be updated to indicate that the mark bitmap does not contain the indication of any marked object ends within the block. If a word is found, the following word may represent the beginning of a possibly-empty garbage range. The garbage collection thread may then use the mark bitmap 120 to identify the next word greater than the identified word that represents the beginning of a marked object. This search may involve traversing subsequent blocks. If any blocks are completely traversed during the search, the clear block bitmap may be updated to note that the mark bitmap 120 is known to not contain indications of either the start or end of a marked object within the skipped blocks. If the end of the heap is discovered before a subsequent marked object is found, the next object may be considered to occur at the word following the end of the heap. The word preceding the identified word may represent the end of the garbage range. If the garbage range is not empty, it may be added to the global allocator 118. Then the search begin boundary may be updated to refer to the word following the garbage range, and the process may be repeated. Special processing may be required when the assigned block is the first block in the heap to ensure that the first garbage range is correctly identified. A garbage collection thread 114 assigned the first block may take the beginning of the first possibly-empty garbage range to be the first word in the block.

After walking the memory to collect garbage ranges, the garbage collection thread 114 may ensure that the inactive array in the global allocator 118 contains only empty lists.

During the third sub-phase, the mark bitmap 120 may be cleared to prepare for marking to take place in the next garbage collection cycle. As the mark bitmap 120 may be of size proportional to the size of the heap, it may be desirable for multiple garbage collection threads 114 to cooperate in clearing it. The heap may be logically divided into block runs, where a block run may be a fixed number, e.g., 64, of contiguous blocks. The garbage collection thread 114 may repeatedly obtain a block run assignment, for example by atomically incrementing a shared counter stored in non-volatile memory to obtain a block run number and being assigned the corresponding block run, and clear the entries of the mark bitmap 120 associated with that block run. For each block in the block run, the garbage collection thread 114 may query the clear block bitmap to determine if it is known that the mark bitmap already contains no indication of marked objects ending in the block. If the clear block bitmap has no such indication for a given block, the garbage collection thread 114 may remove from the mark bitmap 120 indications that any words in the block are the last word in a marked object. This may be done efficiently in some examples, by writing zero values over words that contain bits indicating values pertaining to words in the block. Following the removal, the clear block bitmap may be updated to indicate that the mark bitmap 120 is now known to not contain any such indication for words in the block. Similarly, the garbage collection thread 114 may query the clear block bitmap to determine if it is known that the mark bitmap 120 already contains no indication of marked objects beginning in the block. If the clear block bitmap has no such indication for a given block, the garbage collection thread 114 may remove from the mark bitmap 120 indications that any words in the block are the first word in a marked object, and the clear block bitmap may be updated. In an example, the garbage collection thread may be able to efficiently determine that all blocks in the block run have the same indication in the clear block bitmap with respect to marked object beginnings and/or endings and it may bypass checking individual blocks. At the end of the third sub-phase, the clear block bitmap may indicate that the mark bitmap is known to contain no indications for any block. To prepare for the sweeping phase of the subsequent cycle, the clear block bitmap may be reset to a state in which the status of each block is unknown. If the clear block bitmap has two possible values with respect to each block indication, the interpretation of these values may be exchanged for each cycle. For example, in the sweeping phase of one cycle, a value of 1 may indicate that the mark bitmap 120 is known to not contain indications for words in the block and a value of 0 may indicate that the mark bitmap 120 is not known to contain indication for words in the block, while in the sweeping phase of the next cycle, a value of 0 may indicate knowledge and a value of 1 may indicate lack of knowledge. In this way, the completion of the third sub-phase may leave the clear block bitmap in the correct state for the next sweeping phase.

As noted above, when a garbage collection thread 114 is waiting at a synchronization barrier for the waiting process count to reach the total process count, it may occasionally check to see whether the reason for the delay is that one or more operating system processes 104 have died and, if possible, complete any actions they may have left unfinished. For example, it may be determined, in a first garbage collection thread based on a stored state of a first operating system process from the first and second pluralities of operating system processes, that the first operating system process has terminated. Each operating system process from the first and second pluralities of operating system processes stores an associated state of the process in a non-volatile memory. The work of the first operating system process using the state of the first operating system process stored in the non-volatile memory may be performed in a second garbage collection thread.

This may be accomplished by the following procedure, which may be parameterized by a dead-process-marking action and a cleanup action, each specific to the particular synchronization block. First, the garbage collection thread 114 may create a local map from barrier process IDs to structures containing an indication of whether a garbage collection thread 114 has been identified that is known to have successfully acquired that barrier process ID and also containing a collection of per-process structures 119 associated with dead processes 104 for which it is unknown whether they have successfully acquired that barrier process ID. Next, the garbage collection thread 114 may indicate in the map that its associated barrier process ID is known to have been successfully acquired. The garbage collection thread 114 may then iterate through the per-process structures 119 (other than the one associated with the garbage collection thread 114) in the list 117 of per-process structures 119. Each per-process structure 119 may contain liveness information including a start time and a state of the first garbage collection thread on a non-volatile memory. For each per-process structure 119, a determination may be made, based on the associated liveness information, as to whether the associated process 104 is known to have died. If so, a dead process count may be incremented. The dead process count may be a count of per-process structures 119 that are associated with processes 104 that died before they could successfully increment the count of waiting processes. Following the increment, the next per-process structure 119 may be processed.

If the per-process structure 119 was not identified as known-dead, a check may be made to determine whether the process 104 has in fact died. This may involve using the information in the per-process structure's liveness information. For example, an attempt may be made to determine the start time of the process with the indicated PID, for example, by reading, for a PID of 42, the file "/proc/42/stat" on a system running the Linux® operating system. If no such file can be identified or if the read start time does not match the timestamp in the liveness information, the process 104 may be assumed to have died. If the process 104 is determined to have died, a check may be made as to whether the per-process structure 119 indicated that its garbage collection thread 114 was at the current synchronization barrier. If it is not, it may be inferred that the process died before completing the prior synchronization barrier. In such a case, not only did it not acquire a barrier process ID for this synchronization barrier, it cannot have begun any work that may need to be completed. The dead-process-marking action may be applied to the per-process structure 119. For most synchronization barriers, this action may set the liveness to indicate that the process 104 is dead. (In the case of being applied following Y20, this does nothing.) For the second synchronization barrier in the marking phase, it may do nothing. Following the dead-process-marking action, the dead process count may be incremented and the next per-process structure 119 may be processed.

If the dead process 104 was at the correct barrier, a check may be made of the per-process structure's 119 increment status. If this has the value UNINCREMENTED, then the associated garbage collection thread 114 could not have acquired a barrier process ID. The barrier-specific cleanup action may be applied to the process. By performing this action, the current garbage collection thread 114 may attempt to complete any activities that were in process by the garbage collection thread 114 associated with the dead process 104 at the time it died. To facilitate this, data required to perform a cleanup action may be associated with the per-process structure 119 and stored in non-volatile memory. The cleanup action may return a value that may indicate whether or not the current garbage collection thread 114 should increment the dead process count. In any case, the next per-process structure 119 may be processed.

If the increment status has the value INCREMENTING, then it may be inferred that all activity prior to the synchronization barrier was completed and that therefore no cleanup is necessary, but that it may not be known whether the thread successfully acquired a barrier process ID. It may be noted that the period during which an increment status may have the value INCREMENTING may be very short, and so therefore processes dying with this increment status may be uncommon. The barrier process ID associated with the per-process structure 119 may be obtained. This may or may not be a barrier process ID associated with the current barrier. The structure associated with this barrier process ID may be obtained from the map. If no such structure exists, one may be created with an empty collection and an indication that it is unknown whether the barrier process ID was acquired. If the structure indicates that the barrier process ID was acquired, this may indicate that a previously-identified per-process structure 119 indicated that its garbage collection thread 114 acquired the barrier process ID. Since only one garbage collection thread 114 can acquire a given barrier process ID, it may be inferred that the current per-process structure's 119 garbage collection thread 114 did not. The dead process count may be incremented, the dead-process-marking action may be applied to the current per-process structure 119, and the next per-process structure 119 may be processed. If the structure does not indicate that the barrier process ID was acquired, the current per-process structure 119 may be added to the structure's collection and the next per-process structure 119 may be processed.

If the increment status associated with the per-process structure 119 is INCREMENTED, whether or not the process 104 was determined to have died, and the per-process structure 119 indicates that it is at the current synchronization barrier, it may be inferred that its barrier process ID was successfully acquired. The structure associated with this barrier process ID may be obtained (or created if not there as described above), and it may be set to indicate that the barrier process ID was acquired. Any per-process structures 119 in the structure's collection must therefore represent garbage collection threads 114 that did not successfully acquire the barrier process ID, although they do not require cleanup. The dead-process-marking action may be applied to each.

After all per-process structures 119 have been processed, the structures in the map may be walked, ignoring those that indicate that the barrier process ID has been acquired. Since at most one garbage collection thread 114 can acquire a barrier process ID, all but one of the per-process structures 119 in the structure's collection must be spurious, and the dead process count can be incremented by one less than the size of the collection. If the associated barrier process ID is less than the synchronization barrier's waiting process count, it may be inferred that exactly one of the garbage collection threads 114 associated with a per-process structure 119 in the collection did, in fact, acquire the barrier process ID but died before changing the increment status to INCREMENTED. It may, however, be impossible to determine which per-process structure 119 this applies to. If the associated barrier process ID is equal to the waiting process count, it may be inferred that none of the garbage collection threads 114 associated with a per-process structure 119 in the collection acquired the barrier process ID, since doing so would have raised the waiting process count. Therefore, the dead process count can be incremented once further and the dead-process-marking action can be applied to all the per-process structures 119 in the collection.

After the map has been walked, the new estimate for the number of processes 104 to wait for is the number of per-process structures 119 seen (including the per-process structure 119 associated with the current garbage collection thread 114) minus the dead process count. The garbage collection thread 114 may attempt to change the total process count from the garbage collection thread's 114 last read value of the total process count to the new estimate, with an incremented version number, by using a CAS operation. If this fails, it may indicate that some other thread successfully modified the total count. In any case, the garbage collection thread 114 may change its last read value of the total process count to the current value before continuing to wait.

Within the first modified synchronization barrier of the marking phase, when a garbage collection thread 114 determines that a process 104 associated with a per-process structure 119 has died, it may attempt to complete the dead process's 104 marking activity. To do so, it may first attempt, via a CAS operation, to atomically replace the liveness information of the per-process structure 119 with the garbage collection thread's 114 associated liveness information, marking the per-process structure 119 as associated with the garbage collection thread's 114 process 104, which may cause other garbage collection threads to not determine that the per-process structure 119 is associated with a dead process 104 during the cleanup activity, unless the current process 104 also dies. If the attempt to change the liveness information fails, the garbage collection thread 114 may determine that another garbage collection thread 114 is completing or has completed the marking activity of the dead process 104, and the garbage collection thread 114 may therefore omit attempting to complete the marking activity. To complete the dead process's 104 marking activity, the garbage collection thread 114 may examine all mark buffers 112 and the mark list 116 associated with the per-process structure 119 and may copy references contained therein to the garbage collection thread's 114 associated mark list 116. This may cause the garbage collection thread 114, upon exit of the synchronization barrier to determine that its mark list 116 is no longer empty and to mark the added references.

The cleanup action associated with the synchronization barrier terminating the first sub-phase of the sweeping phase may specify that a garbage collection thread 114 that determines that a process 104 associated with a per-process structure 119 has died with an increment status of UNINCREMENTED may attempt to clean up from the dead garbage collection thread 114 by transferring the contents of the per-process structure's 119 expanded chunk list to the garbage collection thread's 114 associated expanded chunk list. As described above, whether it chooses to do so may be predicated on whether the garbage collection thread 114 is successful in replacing the per-process structure's 119 liveness information with the garbage collection thread's associated liveness information. The return indication of the cleanup action may indicate that the dead process count should be incremented if the cleanup activity was attempted.

The cleanup action associated with the synchronization barrier terminating the third sub-phase of the sweeping phase may specify that a garbage collection thread 114 that determines that a process 104 associated with a per-process structure 119 has died with an increment status of UNINCREMENTED may attempt to clean up from the dead garbage collection thread 114 by clearing the entries of the mark bitmap 120 associated with block run assignment associated with the per-process structure 119, as described above. As described above, whether it chooses to do so may be predicated on whether the garbage collection thread 114 is successful in replacing the per-process structure's 119 liveness information with the garbage collection thread's associated liveness information. The return indication of the cleanup action may indicate that the dead process count should be incremented if the cleanup activity was attempted.

A process 104 may perform the following initialization actions once before any associated application thread 106 may obtain or otherwise make use of references to any objects on the heap. In some aspects, it may be important that steps are taken to ensure that the initialization actions doesn't happen more than once. It may obtain access to system-wide shared data, which may be associated with a control block object in shared non-volatile memory. It may construct a new per-process structure 119 whose liveness information identifies the process 104. It may add the new per-process structure 119 to the list 117 of per-process structures 119. It may, e.g., by means of a CAS operation, atomically increment the shared total process count while simultaneously incrementing the total process count's version number. It may, subsequent to the incrementing, determine the next expected synchronization barrier and cause the per-process structure 119 to reflect that expectation. It may then initialize an external pointer table or other means of capturing non-stack root pointers. And it may create a garbage collection thread 114 and cause it to execute. The garbage collection thread 114 may be configured to begin processing at the correct phase and sub-phase of the garbage collection cycle and may assist in the completion of the garbage collection cycle.

An application thread 106 may perform the following initialization actions before the application thread 106 may obtain or otherwise make use of references to any objects on the heap. The application thread 106 may ensure that its associated process 104 is initialized as described above. The application thread 106 may then ensure that its associated per-thread structure 115 is created, initialized, and made known to the garbage collection thread 114. The application thread 106 may further ensure that the lifetime of the per-thread structure 115 is sufficient that garbage collection-related activity may take place during the termination of the application thread 106. Immediately following such initialization activities, the application thread 106 may take any actions available to application threads. In particular, the application thread 106 may immediately request the allocation of an object on the garbage collected heap and this request may be satisfied by the application thread's 106 local allocator 110 or the global allocator 118 prior to the completion of the garbage collection cycle.

An application thread 106 may add, during the garbage collection cycle, a first new process to the first plurality of operating system processes and a second new process to the second plurality of operating system processes. The application thread 106 may add a new mutator thread executing in the first new process to the plurality of mutator threads and receive an allocation request from the new mutator thread. The application thread 106 may complete the allocation request prior to the end of the garbage collection cycle and add a new garbage collection thread executing in the second new process to the plurality of garbage collection threads and assist, by the new garbage collection thread, the completion of the garbage collection cycle.

A garbage collection thread 114 may participate in maintenance of the per-process structure list 117. It may identify its per-process structure (P1) and the per-process structure 119 that follows P1 in the list 117 (P2). It may determine based on associated liveness information that the process 104 associated with P2 is known to be dead. Based on the determination, it may identify the per-process structure 119 that follows P2 in the list 117 (P3) and cause P1 to consider P3 to follow P1 in the list 117. As this garbage collection thread 114 may be the single live garbage collection thread 114 that can make this modification to P1, it need not be done in a lock-free manner. In this way, dead per-process structures 119 may be removed. Prior to making the modification, the garbage collection thread 114 may check the liveness of P3 and if it is determined to be dead, it may be skipped as well. In this way, multiple dead per-process structures may be removed by a single operation.

Figure 3:
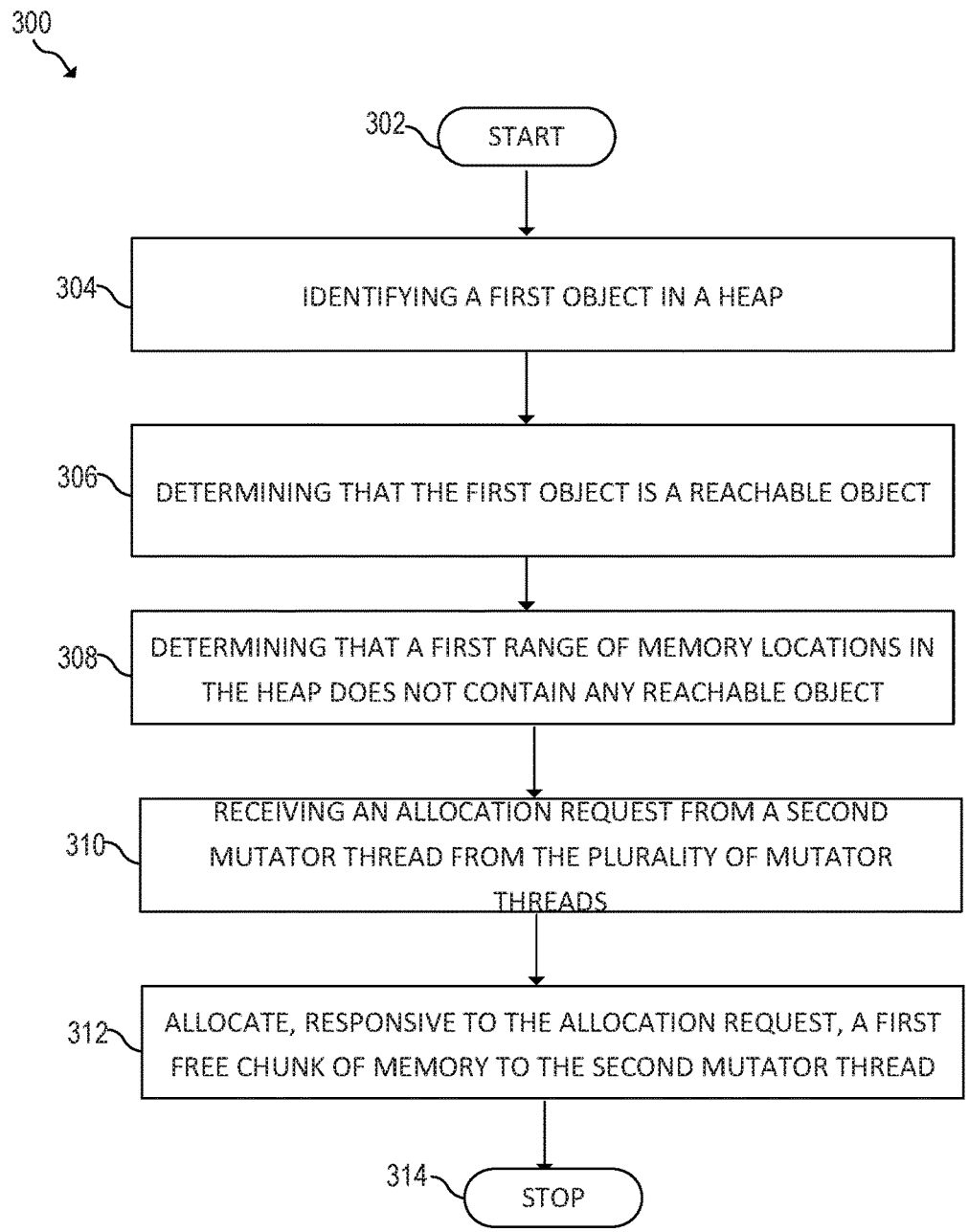
FIG. 3 is a flowchart of another example method for managing objects stored in memory.

FIG. 3 is a flowchart of an example method 300 for managing objects stored in the memory of a computer system. Method 300 may be described below as being executed or performed by a system, for example, system 102 of FIG. 1, system 400 of FIG. 4 or system 500 of FIG. 5. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate examples of the present disclosure, at least one step of method 300 may be executed substantially concurrently or in a different order than shown in FIG. 3. In alternate examples of the present disclosure, method 300 may include more or less steps than are shown in FIG. 3. In some examples, at least one of the steps of method 300 may, at certain times, be ongoing and/or may repeat.

Method 300 may start at step 302 and continue to step 304, where the method may include identifying a first object in a heap. The heap may be accessed by a plurality of mutator threads executing within a first plurality of operating system processes. Each mutator thread in the plurality may have a corresponding garbage collection thread from a plurality of garbage collection threads executing within a second plurality of operating system processes. Method 300 may continue to step 306, where the method may include determining, based on a root pointer associated with a first mutator thread from the plurality of mutator threads, that the first object is a reachable object. Method 300 may continue to step 308, where the method may include determining that a first range of memory locations in the heap does not contain any reachable object. Method 300 may continue to step 310, where the method may include receiving an allocation request from a second mutator thread from the plurality of mutator threads. Method 300 may continue to step 312, where the method may include allocating, responsive to the allocation request, a first free chunk of memory to the second mutator thread. The first free chunk of memory may include at least a part of the first range of memory locations. Method 300 may continue to step 314 where method 300 may end.

Figure 4:
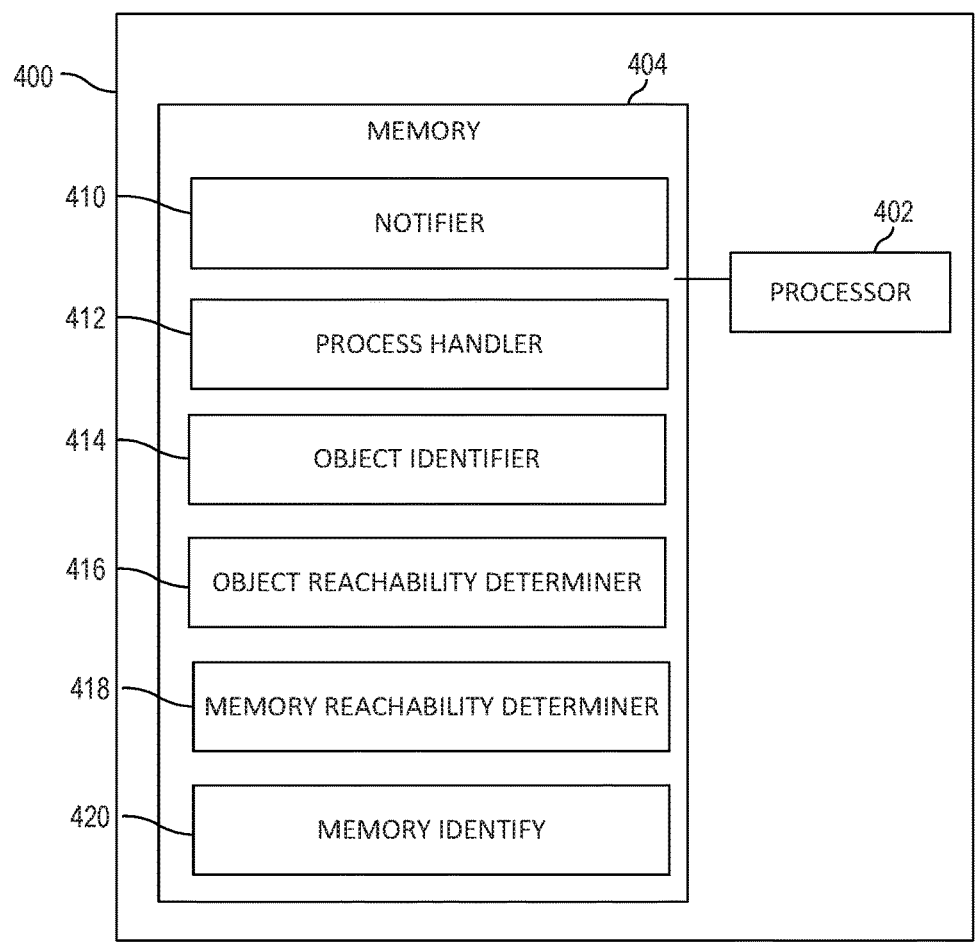
FIG. 4 is a block diagram of an example system for managing objects stored in memory.

FIG. 4 is a block diagram illustrating one example of a processing system 400 for implementing the system 400 for managing objects stored in the memory of a computer system. System 400 may include a processor 402 and a memory 404 that may be coupled to each other through a communication link (e.g., a bus). Processor 402 may include a Central Processing Unit (CPU) or another suitable processor. In some examples, memory 404 stores machine readable instructions executed by processor 402 for system 400. Memory 404 may include any suitable combination of volatile and/or non-volatile memory, such as combinations of Random Access Memory (RAM), Read-Only Memory (ROM), flash memory, and/or other suitable memory.

Memory 404 stores instructions to be executed by processor 402 including instructions for notifier 410, process handler 412, object identifier 414, first object reachability determiner 416, memory reachability determiner 418 and memory identifier 420. The components of system 400 may be implemented in the form of executable instructions stored on at least one machine-readable storage medium of system 400 and executed by at least one processor of system 400. Alternatively or in addition, each of the components of system 400 may be implemented in the form of at least one hardware device including electronic circuitry for implementing the functionality of the component.

Processor 402 may execute instructions of notifier 410 to notify a first mutator process thread belonging to a plurality of mutator process threads that a garbage collection cycle has begun. Each mutator process thread in the plurality may have access to objects located in a heap in a memory. Processor 402 may execute instructions of process handler 412 to pause normal operation of the first mutator process thread so that the garbage collection cycle can proceed. The normal operation may be paused by a time period that is not proportional to a total number of live objects in the heap. The time period may be proportional to a stack size of the first mutator process. Processor 402 may execute instructions of object identifier 414 to identify a first object in the heap, the object belonging to the total number of live objects in the heap. Processor 402 may execute instructions of first object reachability determiner 416 to determine, based on a root pointer associated with a first mutator thread from the plurality of mutator threads, that the first object is a reachable object. Processor 402 may execute instructions of memory reachability determiner 418 to determine that a first range of memory locations in the heap does not contain any reachable object. Processor 402 may execute instructions of memory identifier 420 to identify a first free chunk of memory including at least a part of the first range of memory locations.

Figure 5:
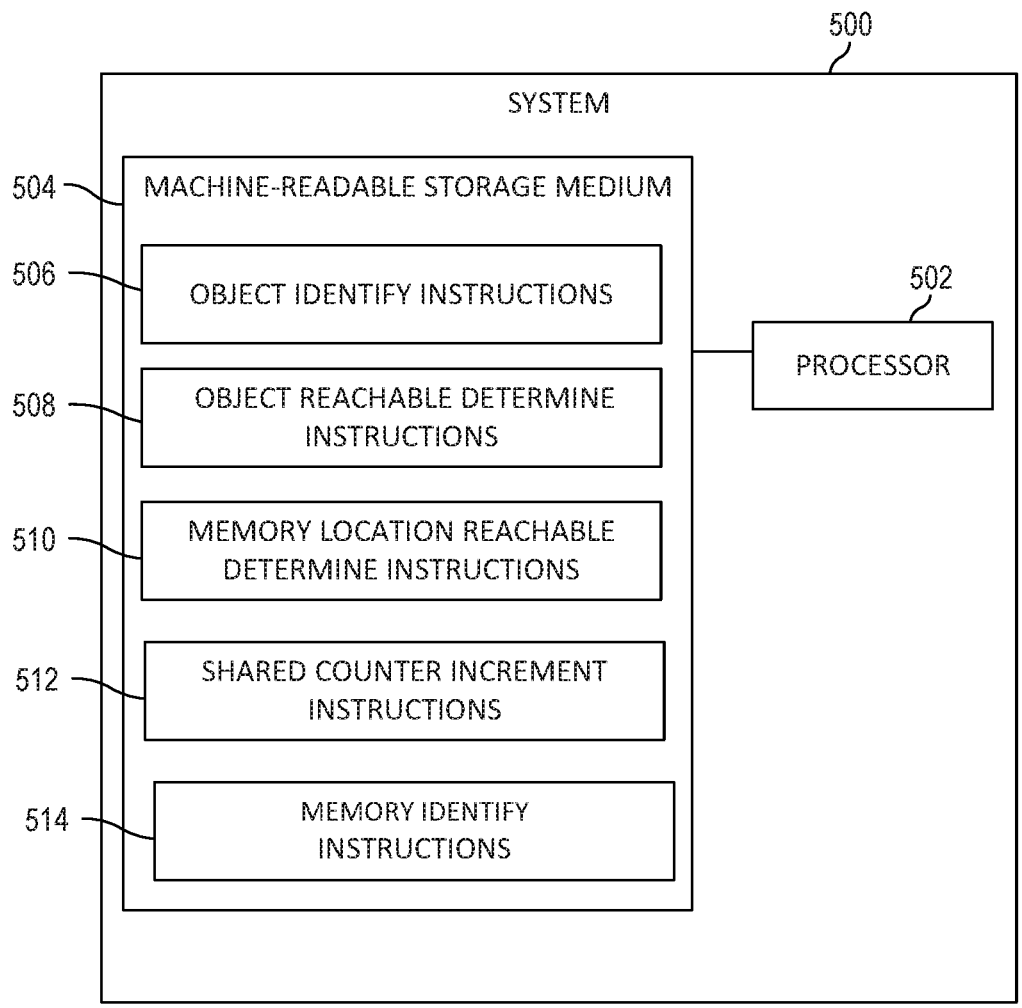
FIG. 5 is a block diagram of an example system for managing objects stored in memory.

FIG. 5 is a block diagram of an example system 500 for managing objects stored in the memory of a computer system. System 500 may be similar to system 102 of FIG. 1, for example. In the example illustrated in FIG. 5, system 500 includes a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be one or more central processing units (CPUs), microprocessors, and/or other hardware devices suitable for retrieval and execution of instructions stored in machine-readable storage medium 504. In the example illustrated in FIG. 5, processor 502 may fetch, decode, and execute instructions 506, 508, 510, 512 and 514 for managing objects stored in the memory of a computer system. As an alternative or in addition to retrieving and executing instructions, processor 502 may include one or more electronic circuits comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), non-volatile memory, an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Alternatively, machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for using pointers in a memory managed system.

Referring to FIG. 5, object identify instructions 506, when executed by a processor (e.g., 502), may cause system 500 to identify a first object in a heap, wherein the heap is accessed by a plurality of mutator threads and a plurality of garbage collection threads. Reachability determine instructions 508, when executed by a processor (e.g., 502), may cause system 500 to determine based on a root pointer associated with a first mutator thread from the plurality of mutator threads that the first object is a reachable object. Garbage collection thread determine instructions 510, when executed by a processor (e.g., 502), may cause system 500 to determine based on a marking phase of a garbage collection cycle performed by a first garbage collection thread belonging to the plurality of garbage collection threads that a first range of memory locations in the heap does not contain any reachable object. Counter increment instructions 512, when executed by a processor (e.g., 502), may cause system 500 to increment a shared counter upon completion of the marking phase by the first garbage collection thread. Memory chunk identify instructions 514, when executed by a processor (e.g., 502), may cause system 500 to identify a first free chunk of memory including at least a part of the first range of memory locations. A second garbage collection thread may determine that a shared counter has not yet reached a total number of processes. It may be determined, based on the start time, that the first garbage collection thread has terminated. The second garbage collection thread may perform work of the first garbage collection thread using the state of the process stored in the non-volatile memory. The total number of processes may be adjusted upon completion of the work of the first garbage collection process.

The foregoing disclosure describes a number of examples for managing objects stored in the memory of a computer system. The disclosed examples may include systems, devices, computer-readable storage media, and methods for using pointers in a memory managed system. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
identifying a first object in a heap, wherein the heap is accessed by a plurality of mutator threads executing within a first plurality of operating system processes and each mutator thread in the plurality has a corresponding garbage collection thread from a plurality of garbage collection threads executing within a second plurality of operating system processes;
determining, based on a root pointer associated with a first mutator thread from the plurality of mutator threads, that the first object is a reachable object;
determining, based on a marking phase of a garbage collection cycle, that a first range of memory locations in the heap does not contain any reachable object;
receiving an allocation request from a second mutator thread from the plurality of mutator threads; and
allocating, responsive to the allocation request, a first free chunk of memory, including at least a part of the first range of memory locations, to the second mutator thread.

2. The method of claim 1, further comprising:
identifying, during a sweeping phase of the garbage collection cycle, a plurality of sweeping threads from a group of threads, the groups of threads including the plurality of mutator threads and the plurality of garbage collection threads;
assigning, to a sweeping thread belonging to the plurality of sweeping threads, a second range of memory locations in the heap;
identifying, by the sweeping thread, a second free chunk of memory beginning within the second range of memory locations; and
making the second free chunk available to an allocator.

3. The method of claim 1, wherein each operating system process from the first and second pluralities of operating system processes stores an associated state of the process in a non-volatile memory, the method further comprising:
determining, in a first garbage collection thread based on the stored state of a first operating system process from the first and second pluralities of operating system processes, that the first operating system process has terminated; and
performing, in a second garbage collection thread, work of the first operating system process using the state of the first operating system process stored in the non-volatile memory.

4. The method of claim 1, further comprising, for each garbage collection thread belonging to the plurality garbage collection thread:
making a first determination that there are no available references for the garbage collection thread to mark;
indicating the first determination in the non-volatile memory;
making a second determination that all garbage collection threads in the plurality of garbage collection threads have indicated and not revoked the first determination;
indicating the second determination in the non-volatile memory;
making a third determination that all garbage collection threads in the plurality of garbage collection threads have indicated and not revoked the second determination; and
determining that the marking phase has ended.

5. The method of claim 1, further comprising:
enumerating a pointer stored within the first object by reference to an object descriptor associated with the first object;
determining that the pointer points to a second object in the heap; and
determining that the second object is a reachable object.

6. The method of claim 1, further comprising:
identifying a potential object pointer associated with a potential object descriptor;
determining that the potential object descriptor is not a valid object descriptor; and
determining that the potential object pointer is not a pointer into the heap.

7. The method of claim 1, further comprising:
adding, during the garbage collection cycle, a first new process to the first plurality of operating system processes and a second new process to the second plurality of operating system processes;
adding a new mutator thread executing in the first new process to the plurality of mutator threads;
receiving an allocation request from the new mutator thread;
completing the allocation request prior to the end of the garbage collection cycle;
adding a new garbage collection thread executing in the second new process to the plurality of garbage collection threads; and
assisting, by the new garbage collection thread, the completion of the garbage collection cycle.

8. The method of claim 1, further comprising:
identifying a second range of memory locations in the heap corresponding to a free chunk contained within a previous global allocator;
determining that a third range of memory locations in the heap adjacent to the second range of memory locations does not contain any reachable object;
expanding the second range of memory locations to a fourth range of memory locations in the heap including at least the second range of memory locations and the third range of memory locations; and
adding the fourth range of memory locations to an allocator.

9. The method of claim 1, wherein a plurality of garbage collection process cooperatively coordinate to execute a garbage collection process.

10. The method of claim 1, further comprising:
identifying a root pointer source object that is not stored on a program stack;
enumerating root pointers based on the root pointer source object; and
determining that objects in the heap pointed to by enumerated root pointers are reachable objects.

11. A system comprising:
a notifier to notify a first mutator process thread belonging to a plurality of mutator process threads that a garbage collection cycle has begun, wherein each mutator process thread in the plurality has access to objects located in a heap in a memory;
a process handler to pause normal operation of the first mutator process thread so that the garbage collection cycle can proceed, wherein the normal operation is paused by a time period that is not proportional to a total number of live objects in the heap;
an object identifier to identify a first object in the heap, the object belonging to the total number of live objects in the heap;
an object reachability determiner to determine, based on a root pointer associated with a first mutator thread from the plurality of mutator threads, that the first object is a reachable object;
a memory reachability determiner to determine that a first range of memory locations in the heap does not contain any reachable object; and
a memory identifier to identify a first free chunk of memory including at least a part of the first range of memory locations.

12. The system of claim 11 wherein the time period is proportional to a stack size of the first mutator process.

13. A non-transitory machine-readable storage medium comprising instructions executable by a processor of a computing device, the machine-readable storage medium comprising instructions to:
identify a first object in a heap, wherein the heap is accessed by a plurality of mutator threads and a plurality of garbage collection threads;
determine based on a root pointer associated with a first mutator thread from the plurality of mutator threads that the first object is a reachable object;
determine based on a marking phase of a garbage collection cycle performed by a first garbage collection thread belonging to the plurality of garbage collection threads that a first range of memory locations in the heap does not contain any reachable object;
increment a shared counter upon completion of the marking phase by the first garbage collection thread; and
identify a first free chunk of memory including at least a part of the first range of memory locations.

14. The non-transitory machine-readable storage medium of claim 13 further comprising instructions to:
store a start time and a state of the first garbage collection thread on a non-volatile memory.

15. The non-transitory machine-readable storage medium of claim 14 further comprising instructions to:
determine, by a second garbage collection thread, that the shared counter has not yet reached a total number of processes;
determine, based on the start time, that the first garbage collection thread has terminated;
perform, by a second garbage collection thread, work of the first garbage collection thread using the state of the process stored in the non-volatile memory; and
adjust the total number of processes upon completion of the work of the first garbage collection process.

* * * * *